United States Patent
Norman

(10) Patent No.: US 7,278,019 B2
(45) Date of Patent: Oct. 2, 2007

(54) METHOD OF HINDERING THE PROPAGATION OF A COMPUTER VIRUS

(75) Inventor: Andrew Patrick Norman, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 817 days.

(21) Appl. No.: 10/287,101

(22) Filed: Nov. 4, 2002

(65) Prior Publication Data
US 2004/0088564 A1    May 6, 2004

(51) Int. Cl.
*H04L 9/00* (2006.01)
*G06F 12/14* (2006.01)
*G06F 15/16* (2006.01)
*G08B 23/00* (2006.01)
*G06F 15/173* (2006.01)
*G06F 11/30* (2006.01)

(52) U.S. Cl. .............. 713/170; 713/188; 726/24; 709/224; 709/228

(58) Field of Classification Search .............. None
See application file for complete search history.

(56) References Cited

U.S. PATENT DOCUMENTS

| | | | | |
|---|---|---|---|---|
| 6,678,734 | B1* | 1/2004 | Haatainen et al. | 709/230 |
| 7,089,589 | B2* | 8/2006 | Chefalas et al. | 726/22 |
| 7,093,292 | B1* | 8/2006 | Pantuso | 726/23 |
| 7,096,368 | B2* | 8/2006 | Kouznetsov et al. | 713/189 |
| 7,185,232 | B1* | 2/2007 | Leavy et al. | 714/41 |
| 2002/0147780 | A1* | 10/2002 | Liu et al. | 709/206 |
| 2002/0178381 | A1* | 11/2002 | Lee et al. | 713/201 |
| 2003/0208616 | A1* | 11/2003 | Laing et al. | 709/236 |
| 2004/0003284 | A1* | 1/2004 | Campbell et al. | 713/201 |
| 2004/0010703 | A1* | 1/2004 | Kouznetsov et al. | 713/200 |

FOREIGN PATENT DOCUMENTS

WO    WO 2004028103 A1 *    4/2004

OTHER PUBLICATIONS

Kewley, Dorene. Fink, Russ. Lowry, John. Dean, Mike. "Dynamic Approaches to Thwart Adversary Intelligence Gathering". Jun. 2001. DARPA Information Survivability Conference & Exposition II, 2001. pp. 176-185. Found on the World Wide Web at: http://ieeexplore.ieee.org/iel5/7418/20170/00932214.pdf?tp=&arnumber=932214&isnumber=20170.*

* cited by examiner

*Primary Examiner*—Ayaz Sheikh
*Assistant Examiner*—Jeremiah Avery

(57) ABSTRACT

A method of hindering the propagation of a computer virus on a computer network is disclosed. The computer network comprises a plurality of addressable connections capable of receiving data from at least one computer system, and a detection computer arranged to detect the presence of a computer virus. The method comprises: operating the detection computer to monitor the plurality of addressable connections thereby to detect the presence of a computer virus on at least one of the addressable connections; in the event that a computer virus is detected, identifying the at least one computer system that sent the computer virus to the at least one addressable connection; and sending virus remediating means to the at least one identified computer system, the virus remediating means being arranged at least to hinder the operation of the computer virus. A computer program and computer system for hindering the propagation of a computer virus is also disclosed.

27 Claims, 3 Drawing Sheets

METHOD OF HINDERING THE PROPAGATION OF A COMPUTER VIRUS

FIELD OF THE INVENTION

The invention relates to a method of hindering the propagation of a computer virus on a computer network. The invention also relates to a computer program and computer system for hindering the propagation of a computer virus on a computer network.

BACKGROUND OF THE INVENTION

Computer networks are used in many types of organisation, for example within business, industrial and educational organisations. A computer network typically comprises a number of computer systems interconnected by data communications links. Computer networks allow data to be shared between users of individual organisations, and also between users of different organisations.

Computer systems connected to such computer networks operate using software executed on the systems. Such software may contain vulnerabilities which render the software, and computer systems running the software, susceptible to interference by unauthorised means. As will be appreciated by those skilled in the art, a software vulnerability may be considered a feature of that software which renders it susceptible to processing operations not intended to be permitted or performed by that software. Examples of software vulnerabilities include features that enable malicious mobile code, e.g. computer viruses, to access and/or manipulate the software. Examples of well-known computer viruses are so-called 'worms' (which exploit software vulnerabilities and propagate through computer networks), and self-contained virus programs which usually require execution before any unwanted processing results.

Since computer networks facilitate the transfer of data across a large number of computer systems in a relatively short space of time, computer viruses, and especially worms-type viruses, can rapidly propagate across large network areas. The costs involved in remedying 'infected' systems can be very large and it is important that viruses are identified and mitigated as soon as possible so that their ability to spread across networks is limited.

A computer system which is arranged to slow down the spread of a computer virus is known. This conventional computer system operates by slowing the data connection between itself and any other computer which attempts to send it a computer virus.

SUMMARY OF THE INVENTION

According to a first aspect of the invention, there is provided a method of hindering the propagation of a computer virus on a computer network, the computer network comprising a plurality of addressable connections capable of receiving data from at least one computer system, and a detection computer arranged to detect the presence of a computer virus, the method comprising: operating the detection computer to monitor the plurality of addressable connections thereby to detect the presence of a computer virus on at least one of the addressable connections; in the event that a computer virus is detected; identifying the at least one computer system that sent the computer virus to the at least one addressable connection; and sending virus remediating means to the at least one identified computer system, the virus remediating means being arranged to hinder the operation of the computer virus.

Accordingly, it is made possible to detect the presence of a virus being propagated within a network and to effect remediation of that identified virus by means of identifying the computer system from which the virus was sent. The detection and remediation operations have particular advantages in terms of preventing, or at least slowing, the propagation of a computer virus. This is because computer systems that are already 'infected' with a virus will be primarily responsible for propagating the virus.

The term "addressable connection" is meant to refer to any means by which a computer system can be addressed on a computer network. A network address, such as an IP address, an example of an addressable connection. A Uniform Resource Locator (URL) is another example.

Preferably, the detection computer sends the virus remediating means to the at least one identified computer system.

Alternatively, the computer network may further comprise a management computer which, in accordance with receiving a command signal from the detection computer, sends the virus remediating means to the at least one identified computer system, the command signal from the detection computer identifying said at least one computer system.

The detection computer can identify the network address of the computer system that sent the computer virus to the at least one addressable connection, the virus remediating means being sent to said network address. The network address can, for example, be an IP address.

The virus remediating means may be a virus signature, or a virus scanning update. Alternatively, the virus remediating means may be an executable virus remediating program. The executable virus remediating program may be automatically sent as an attachment using an email protocol.

The step of sending virus remediating means may comprise sending an interrogation program to the at least one computer system, the interrogation program being capable of exploiting a software vulnerability present in the at least one computer system, the interrogation program being arranged to hinder the operation of the computer virus after the software vulnerability is exploited. Once a software vulnerability is exploited, the interrogation program may effectively access software on the computer system in order to run a remediation program, such as a virus killer, or a program for mitigating the operation of the virus.

The detection computer may be arranged to detect the presence of a plurality of different computer viruses, the method further comprising selecting one of a plurality of virus remediating means in accordance with the computer virus identified, the selected virus remediating means being sent to the at least one identified computer system.

In accordance with a second aspect of the invention, there is provided a method of hindering the propagation of a computer virus on a computer network, the computer network comprising a plurality of addressable connections capable of receiving data from at least one computer system having an associated network address, and a detection computer arranged to detect the presence of a plurality of different computer viruses, the method comprising: operating the detection computer to monitor the plurality of addressable connections thereby to detect the presence of at least one computer virus on at least one of the addressable connections; in the event that a computer virus is detected, identifying the network address associated with the at least one computer system that sent the computer virus to the at least one addressable connection; and sending virus remediating means to the network address so identified, the virus remediating means being arranged to hinder the operation of the computer virus.

In accordance with a third aspect of the invention, there is provided a computer program stored on a computer usable medium, the computer program comprising computer readable instructions arranged to operate under the control of a processing means capable of being connected to a computer network having a plurality of addressable connections, the computer program performing the steps of: monitoring the plurality of addressable connections thereby to detect the presence of a computer virus on at least one of the addressable connections; in the event that a computer virus is detected, identifying the at least one computer system that sent the computer virus to the at least one addressable connection; and causing virus remediating means to be sent to the at least one identified computer system, the virus remediating means being arranged to hinder the operation of the computer virus.

In accordance with a fourth aspect of the invention, there may be provided a computer program stored on a computer usable medium, the computer program comprising computer readable instructions for causing a processing means, capable of being connected to a computer network having a plurality of addressable connections, to perform the steps of: monitoring the plurality of addressable connections thereby to detect the presence of at least one computer virus on at least one of the addressable connections; in the event that a computer virus is detected, identifying a network address associated with the at least one computer system that sent the computer virus to the at least one addressable connection; and causing virus remediating means to be sent to the network address so identified, the virus remediating means being arranged to hinder the operation of the computer virus.

There may be provided a computer system for connection to a computer network, the computer system having a processing means arranged to operate under the control of any of the computer programs described above.

In accordance with a fifth aspect of the invention, there may be provided a detection system for connection to a computer network having a plurality of addressable connections capable of receiving data from at least one computer system, the detection system comprising: a monitoring system arranged to monitor the plurality of addressable connections thereby to detect the presence of a computer virus on at least one of the addressable connections; an identification system arranged to identify the at least one computer system that sent the computer virus to the at least one addressable connection; and a remediating system arranged to send virus remediating means to the at least one identified computer system, the virus remediating means being arranged to hinder the operation of the computer virus.

The invention will now be described, by way of example, with reference to the accompanying drawings.

DETAILED DESCRIPTION OF A PREFERRED EMBODIMENT

Figure 1:
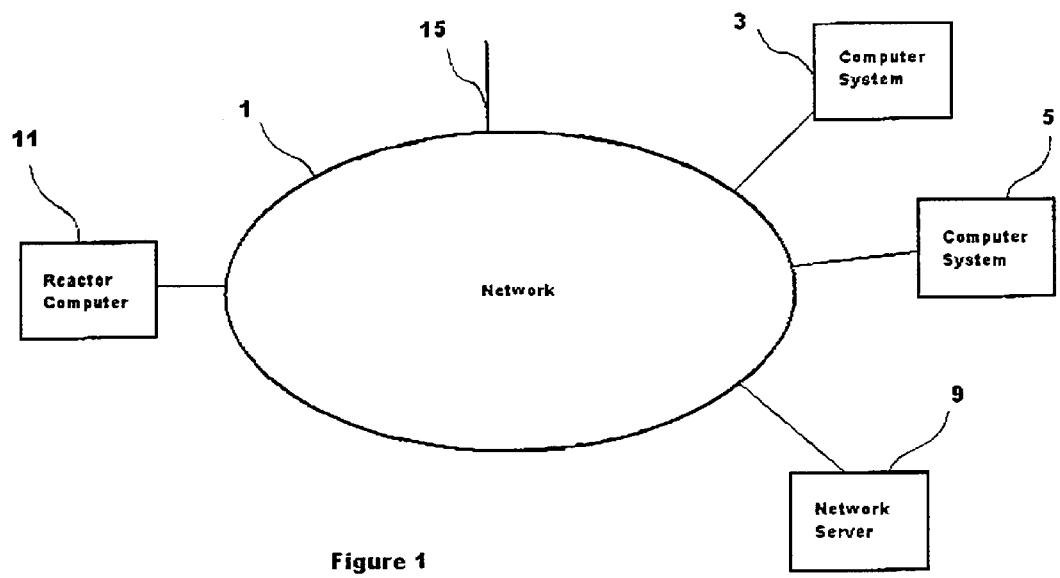
FIG. 1 is a schematic diagram of a computer network.

Referring to FIG. 1, a computer network 1 is shown comprising first and second computer systems 3, 5, a network server 9, and a so-called "reactor" computer 11. Although only first and second computer systems 3, 5, are shown, it will be appreciated that many other computer systems can be connected to the computer network 1, either directly, or by means of other network links 15. The first and second computer systems 3, 5 may be Personal Computers (PCs) to which are assigned respective network addresses, in this case IP addresses. It will be appreciated that computer systems are able to communicate with other computer systems by addressing their respective IP addresses. One or more IP addresses may be assigned to particular computer systems. The use of network addresses, such as IP addresses, make it possible to communicate with computer systems without knowing their physical location or associated user. Each of the first and second computer systems 3, 5 have an associated IP address and a number of software programs running thereon, for example an operating system, a word processing package, and an Internet application (e.g. a client application, such as a web browser, or a web server application).

It is common for computer networks to have a number of network addresses which, at any particular time, are unused. In the case of the computer network 1 shown in FIG. 1, there are a number of unused IP addresses which are accessible by means of the network server 9. It is possible for malicious code, hereafter referred to as viruses, to attempt to contact these unused network addresses, for example in order to propagate through the computer network 1. In order to combat the propagation of such computer viruses, the reactor computer 11 is configured to monitor each of the unused IP addresses in order to detect if an attempt is being made to send a computer virus using one of the unused IP addresses. This monitoring may include responding to connection attempts so as to enable some data to be received, the received data being checked to see if it contains a virus. If so, the reactor computer 11 is arranged to identify the computer system sending the virus, and to cause software remediation means to be sent to that identified computer system so as to mitigate the effect of the virus so identified. The reactor computer 11 is also arranged to monitor its own IP address in order to detect whether an attempt is being made to send a virus directly to it, rather than via one of the unused IP addresses.

Figure 2:
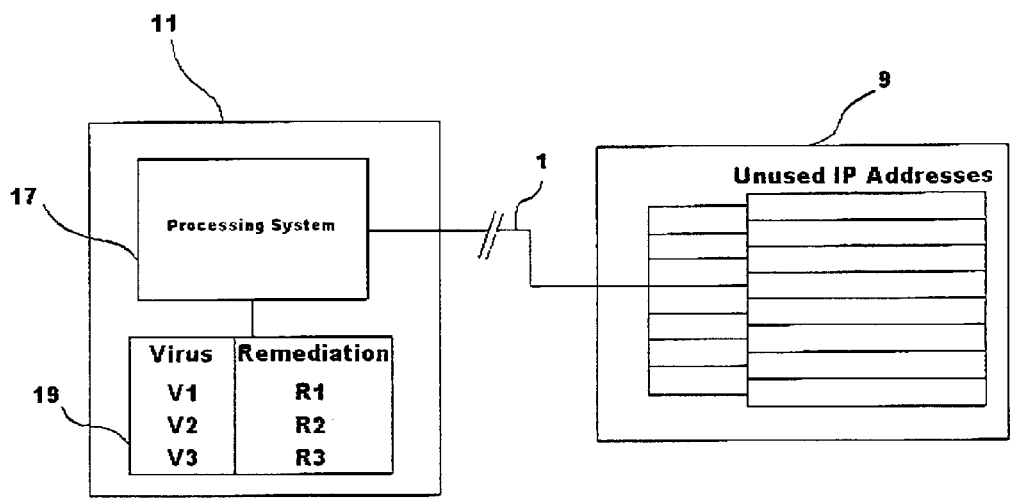
FIG. 2 is a block diagram of a reactor computer connected to a network server using the computer network of FIG. 1.

Referring to FIG. 2, the reactor computer 11 comprises a processing system 17 which runs first, second and third application programs. Each of the first to third application programs is capable of being attacked by a number of known viruses sent by corresponding first, second and third application programs running on each of the first and second computer systems 3, 5. However, in this case, each application program running on the reactor computer 11 is modified so that it is immune, or not vulnerable, to the known viruses. Thus, the reactor computer 11 can respond to attempts made to contact it so that some data is received. Since the application programs are immune to known viruses, the data received will not cause infection of the software. Indeed, the received data is used to detect the presence of a virus.

As mentioned, the processing system 17 is arranged to detect when an attempt is made to infect one or more of the application programs with a virus, either by way of data sent directly to the IP address of the reactor computer 11, or indirectly to one of the unused IP addresses being monitored by the reactor computer 11. When an attempt is made to infect one or more of the application programs with a virus, the processing system 17 is arranged to identify the particular virus sent and the source of that virus, i.e. the computer system that sent the virus to the monitored IP address. For example, if the first computer system 3 attempts to send a virus to the reactor computer 11, the processing system 17 of the reactor computer will identify the IP address associated with the first computer system 3.

As mentioned above, when a virus attempt is identified, the reactor computer 11 is arranged to send virus remediation means to the identified computer system that sent the virus to the IP address being monitored. The virus remediation means can be any means capable of hindering, or preventing, the operation of a particular virus, particularly its propagation operation. For example, the virus remediation means could be a virus signature, a virus scanner update, or a virus remediation program. The virus remediation program can include some exploitation facility that enables the program to access the identified computer system (which is infected with the virus) and to remove the virus appropriately. The exploitation facility may access the computer system using a vulnerability in software running thereon. Once the exploitation facility accesses the relevant computer system, remediation can be effected. In the situation shown in FIG. 2, the remediation operation is facilitated by a database 19 which is stored in the reactor computer 11, although the database could be external (so long as appropriate security measures are taken). In the case shown in FIG. 2, the reactor computer 11 is arranged to detect three known viruses, referred to as V1-V3, and so the database 19 stores three remediation programs R1-R3 which are respectively arranged to mitigate the effect of the three viruses V1-V3. Accordingly, if the first computer system 3 attempts to send the known virus V1 to the reactor computer 11, the processing system 17 of the reactor computer 11 will identify the virus V1 and so retrieve the remediation program R1 from the database 19. The processing system 17 will also identify the IP address of the first computer system 3. The remediation program R1 is then sent by the processing system 17 to the IP address of the first computer system 3.

The general operation of the reactor computer 11 will now be described with reference to the flow diagram of FIG. 3. This general operation may be embodied in a computer program arranged to control the processing system 17 of the reactor computer 11.

Figure 3:
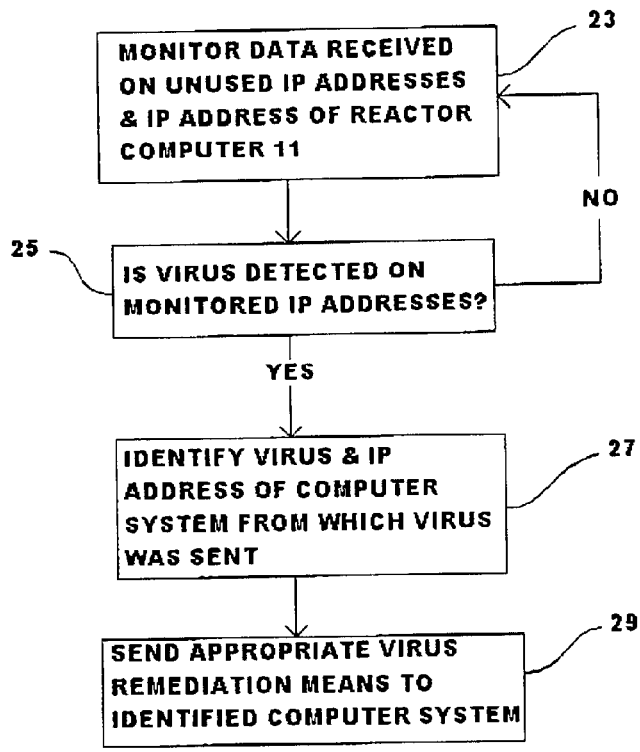
FIG. 3 is a flow diagram showing operating steps performed by the reactor computer shown in FIG. 2.

Referring to FIG. 3, in a first step 23, unused IP addresses and the IP address of the reactor computer 11 are monitored in order to determine whether a computer system, e.g. the first or second computer system 3, 5, is attempting to send a virus to the reactor computer 11. As mentioned, this may involve responding to a connection request from the first or second computer system 3, 5 and receiving some data from the relevant computer system. The received data can then be checked to see if a virus is present. In a second step 25, if it is determined that no such attempt is made, the monitoring step 23 continues. If such an attempt is made, in a third step 27, the particular virus, e.g. V1, is identified, as is the IP address of the computer system from which the virus was sent. In a fourth step 29, remediation means, e.g. R1, appropriate to the identified virus is retrieved and sent to the IP address of the identified computer system.

If desired, the remediation means could be arranged to send management data back to the reactor computer 11, for example to notify the reactor computer of the progress of the remediation operation being performed.

Figure 4:
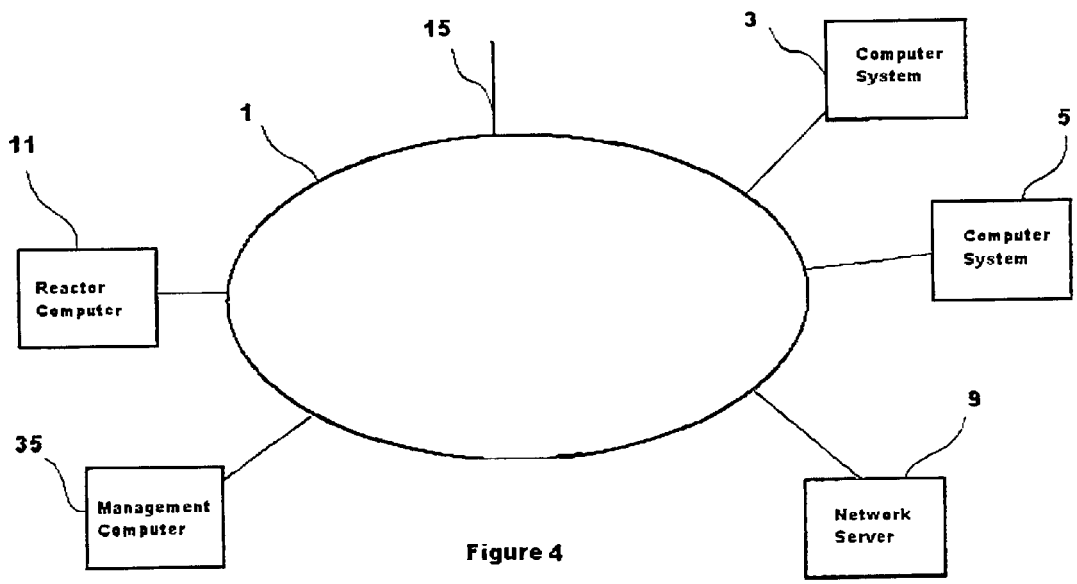
FIG. 4 is a schematic diagram of a modified computer network.

In a variation of the system and method described above, the task of sending remediation means to the identified computer system could be performed by separate processing means. Referring to FIG. 4, which is a modified version of FIG. 1, it will be seen that a further "management computer" 35 forms part of the computer network 1. In this case, rather than the database 19 being stored within the reactor computer 11, it is actually stored within the management computer 35. When the reactor computer 11 identifies that a particular virus, e.g. V1, has been sent from a particular computer system, e.g. the first computer system 3, it sends control data to the management computer 35 which is thereafter responsible for performing the remediation operation. The control data will include the identification of the virus V1 and the IP address of the first computer system 3. The management computer 35 uses this control data to retrieve the appropriate remediation program R1 and to send R1 to the first computer system.

Figure 5:
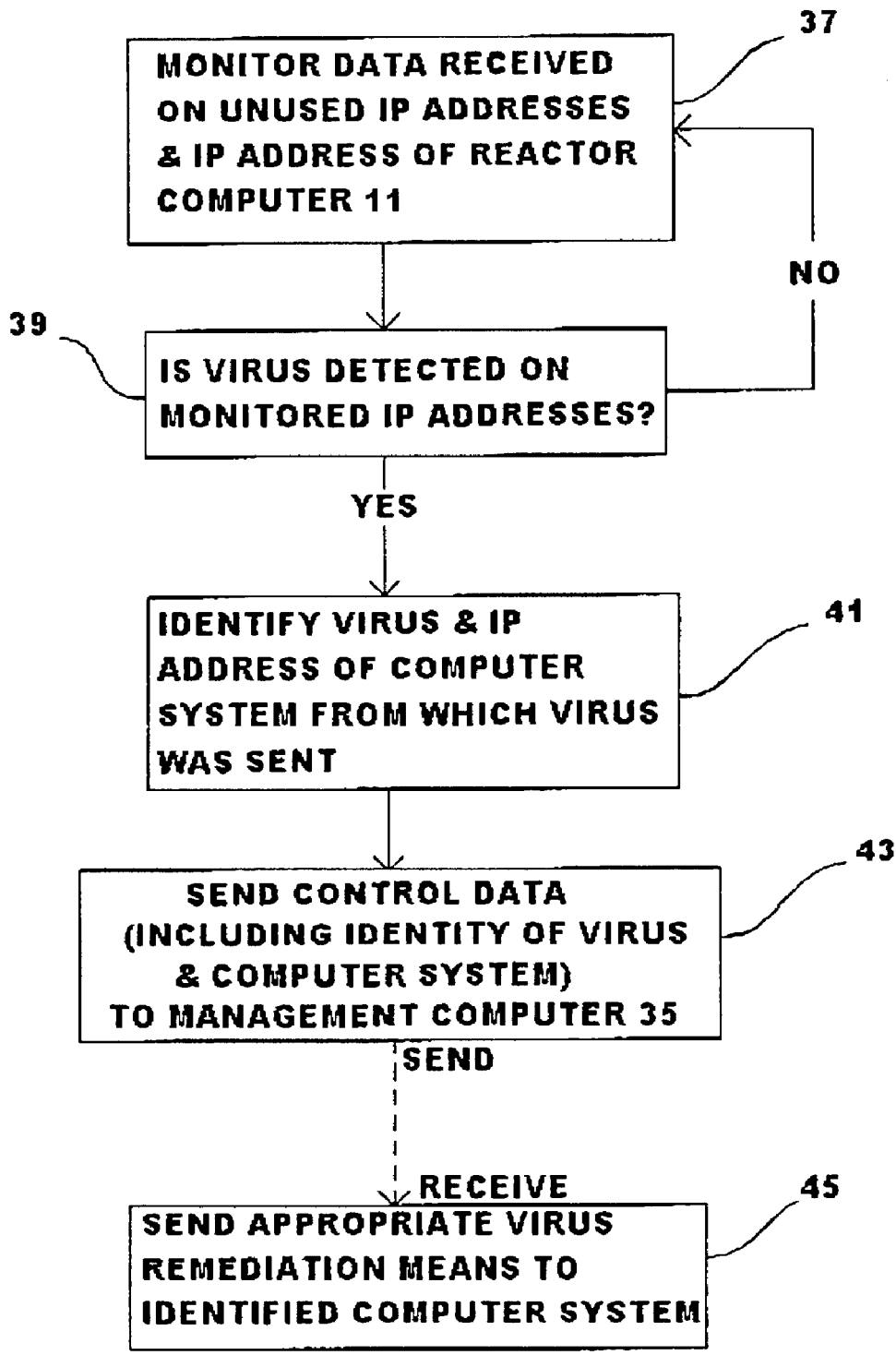
FIG. 5 is a flow diagram showing operating steps performed by a reactor computer and a management computer connected to the modified computer network shown in FIG. 4.

The general operation of the reactor computer 11 and the management computer 35 shown in FIG. 4 will now be described with reference to the flow diagram of FIG. 5. In a first step 37, as before, unused IP addresses and the IP address of the reactor computer 11 are monitored in order to determine whether a computer system, e.g. the first or second computer system 3, 5, is attempting to send a virus to the reactor computer 11. In a second step 39, if it is determined that no such attempt is made, the monitoring step 37 continues. If such an attempt is made, in a third step 41, the particular virus, e.g. V1, is identified, as is the IP address of the computer system from which the virus was sent. In a fourth step 43, a set of control data is generated by the reactor computer 11 which is then sent to the management computer 35. The management computer 35 operates to receive the sent control data, to retrieve remediation means appropriate to the identified virus, e.g. R1, and to send the remediation means to the IP address of the identified computer system, e.g. the first computer system 3.

The system and method described above acts to prevent the spread of computer viruses across the computer network 1. It will be appreciated that if a virus (and particularly a propagating virus such as a worm-type virus) is known to exist and a fix/remediation means is available for that virus, then the propagation of that virus can be stopped, or at least hindered, by targeting computer systems which are known to be already infected with the virus. This is mainly because these computer systems are responsible for propagating the virus. The system and method allows accurate determination of the machines that are infected.

As briefly mentioned above, the remediation means sent to the identified computer system can be any means capable of mitigating the effect of the computer virus. One example is that of a remediation payload that comprises an exploit program designed to take advantage, or exploit, a known software vulnerability. By exploiting a software vulnerability, the remediation payload is then able to perform virus remediation operations on the accessed software, which remediation operations may include full or partial removal of the virus.

In a further modification of the system and method described above, both the reactor computer 11 and the management computer 35 may store a copy of the database 19 so that either is able to effect the required remediation operation.

The reactor computer 11 may be configured to maintain a record of the IP address of each computer system that has been identified as having sent a virus.

What is claimed is:

1. A method of hindering the propagation of a computer virus on a computer network, the computer network comprising a plurality of addressable connections capable of receiving data from at least one computer system, and a detection computer arranged to detect the presence of a computer virus, the method comprising:
    operating the detection computer to monitor the plurality of addressable connections and identify an attempt to contact an unused network address thereby to detect the presence of a computer virus on at least one of the addressable connections;
    in the event that a computer virus is detected, identifying the at least one computer system that sent the computer virus to the at least one addressable connection; and
    sending virus remediating means to the at least one identified computer system, the virus mediating means being arranged to binder the operation of the computer virus.

2. A method according to claim 1, wherein the detection computer sends the virus remediating means to the at least one identified computer system.

3. A method according to claim 1, wherein the computer network further comprises a management computer which, in accordance with receiving a command signal from the detection computer, sends the virus remediating means to the at least one identified computer system, the command signal from the detection computer identifying said at least one computer system.

4. A method according to claim 1, wherein the detection computer identifies the network address of the computer system that sent the computer virus to the at least one addressable connection, the virus remediating means being sent to said network address.

5. A method according to claim 4, wherein the network address is the IP address of said computer system.

6. A method according to claim 1, wherein the sent virus remediating means is a virus scanning update.

7. A method according to claim 1, wherein the sent virus remediating means is an executable virus remediating program.

8. A method according to claim 7, wherein the executable virus remediating program is automatically sent as an attachment using an email protocol.

9. A method according to claim 1, wherein the step of sending virus remediating means comprises sending an interrogation program to the at least one computer system, the interrogation program being capable of exploiting a software vulnerability present in the at least one computer system, the interrogation program being arranged to hinder the operation of the computer virus after the software vulnerability is exploited.

10. A method according to claim 1, wherein the detection computer is arranged to detect the presence of a plurality of different computer viruses, the method further comprising selecting one of a plurality of virus remediating means in accordance with the computer virus identified, the selected virus remediating means being sent to the at least one identified exit ed computer system.

11. A method of hindering the propagation of a computer virus on a computer network, the computer network comprising a plurality of addressable connections capable of receiving data from at least one computer system having an associated network address, and a detection computer arranged to detect the presence of a plurality of different computer viruses, the method comprising:
    operating the detection computer to monitor the plurality of addressable connections and identify an attempt to contact an unused network address thereby to detect the presence of an least one computer virus on at least one of the addressable connections;
    in the event that a computer virus is detected, identifying the network address associated with the at least one computer system that sent the computer virus to the at least one addressable connection; and
    sending virus remediating means to the network address so identified, the virus remediating means being arranged to binder the effect of the computer virus.

12. A computer program stored on a computer usable medium, the computer program comprising computer readable instructions arranged to operate under the control of a processing means capable of being connected to a computer network having a plurality of addressable connections, the computer program performing the steps of:
    monitoring the plurality of addressable connections thereby to identify an attempt to contact an unused network address and detect the presence of a computer virus on at least one of the addressable connections;
    in the event tat a computer virus is detected, identifying the at least one computer system that sent the computer virus to the at least one addressable connection; and
    causing virus remediating means to be sent to the at least one identified computer system, the virus remediating means being arranged to hinder the operation of the computer virus.

13. A computer program according to claim 12, wherein the computer program causes the processing means to send the virus remediating means to the at least one identified computer system.

14. A computer program according to claim 12, wherein the computer program causes the processing means to send a command signal to a further processing means the command signal identifying the at least one identified computer system.

15. A computer program according to claim 12, wherein the computer program causes the processing means to identify a network address associated with the at last one identified computer system, the virus remediating means being sent to the network address so identified.

16. A computer program according to claim 15, wherein the network address is the IP address of said at least one identified computer system.

17. A computer program according to claim 12, wherein the virus remediating means is a virus scanning update.

18. A computer program according to claim 12, wherein the virus remediating means is an executable virus remediating program.

19. A computer program according to claim 18, wherein the executable virus remediation program is sent as an attachment using an email protocol.

20. A computer program according to claim 12, wherein the computer program is capable of causing the processing means to detect the presence of a plurality of different computer viruses, the computer program further being arranged to select one of a plurality of virus remediating means in accordance with the computer virus so identified, the selected virus remediating means being sent to the at least one identified computer system.

21. A computer program stored on a computer usable medium, the computer program comprising computer readable instructions for causing a processing means, capable of being connected to a computer network having a plurality of addressable connections, to perform the steps of:
   monitoring the plurality of addressable connections thereby to identity an attempt to contact an unused network address and detect the presence of at least one computer virus on at least one of the addressable connections;
   in the event that a computer virus is detected, identifying a network address associated with in the at least one computer system that sent the computer virus to the at least one addressable connection; and
   causing virus remediating means to be sent to the network address so identified, the virus remediating means being arranged to hinder the operation of the computer virus.

22. A computer system for connection to a computer network, the computer system having a processing means arranged to operate under the control of the computer program of claim 12.

23. A computer system for connection to a computer network, the computer system having a processing means arranged to operate under the control of the computer program of claim 21.

24. A detection system for connection to a computer network having a plurality of addressable connections capable of receiving data from at least one computer system, the detection system comprising:
   a monitoring system arranged to monitor the plurality of addressable connections thereby to identify an attempt to contact an unused network address and detect the presence of a computer virus on at least one of the addressable connections;
   an identification system arranged to identify the at least one computer system that sent the computer virus to the at least one addressable connection; and
   a remediating system arranged to send virus remediating means to the at least one identified computer system, the virus remediating means being arranged to hinder the operation of the computer virus.

25. A method of detecting a source of malicious code within a computer network comprising the steps of:
   monitoring network traffic;
   identifying, from the network traffic, an attempt to contact an unused network address; and
   identifying from the attempt, a source of the attempt within the network.

26. A method according to claim 25 further comprising the step of responding to the attempt, thereby to enable data to be received and to determine, from the received data, whether it contains malicious code.

27. A method according to claim 26 further comprising the step of remediating a network computer which is the source of the attempt if the data received is found to contain a virus.

* * * * *